W. S. MURDOCK.
MOLD FOR FORMING WALLS AND FLOORS.
APPLICATION FILED FEB. 26, 1919.
1,319,606.
Patented Oct. 21, 1919.
2 SHEETS—SHEET 2.
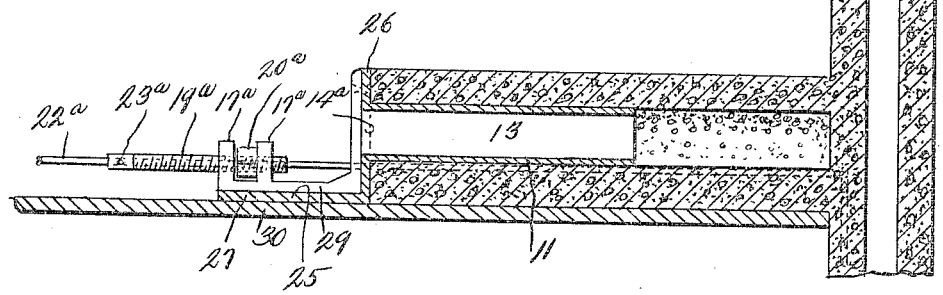
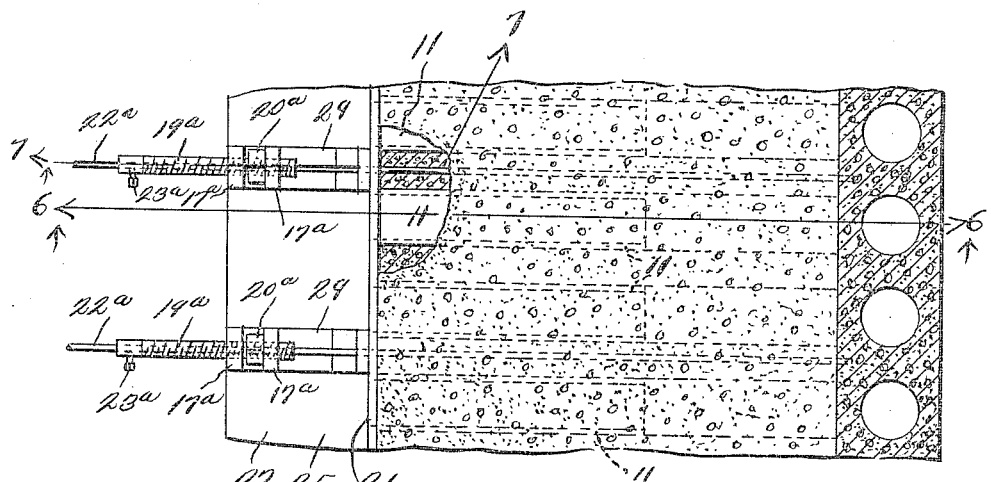
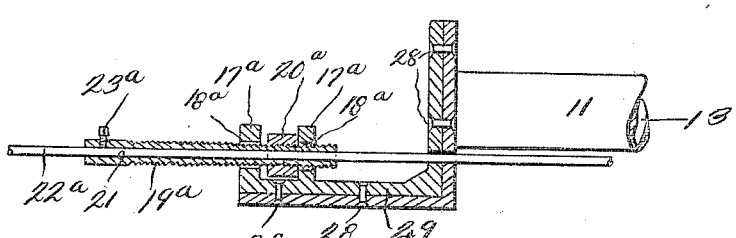
Inventor
W. S. Murdock
By D. Swift & Co.
Attorneys

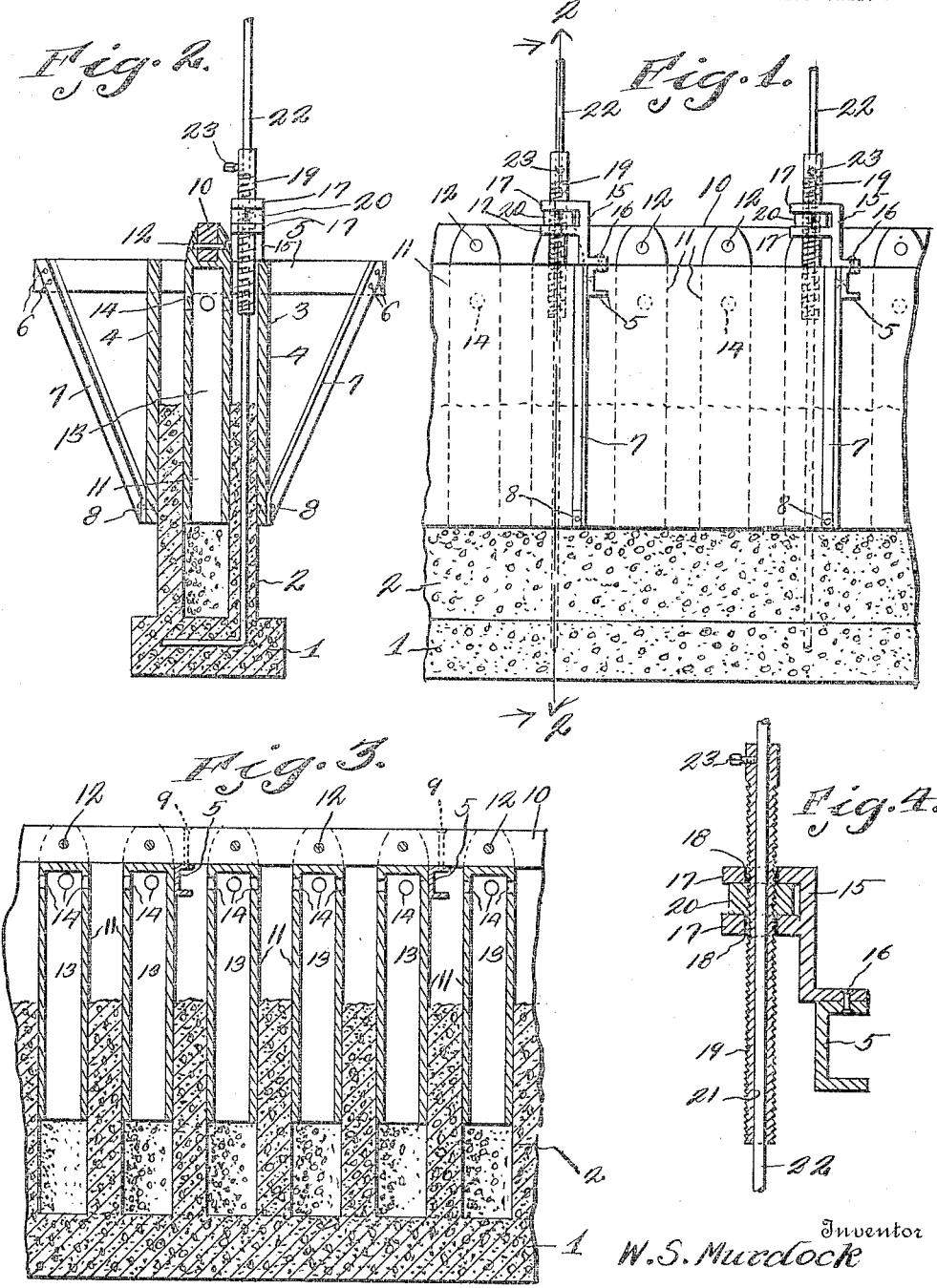

UNITED STATES PATENT OFFICE.

WALTER SCOTT MURDOCK, OF HOUSTON, TEXAS.

MOLD FOR FORMING WALLS AND FLOORS.

1,319,606. Specification of Letters Patent. Patented Oct. 21, 1919.

Application filed February 26, 1919. Serial No. 279,232.

*To all whom it may concern:*

Be it known that I, WALTER SCOTT MURDOCK, a citizen of the United States, residing at Houston, in the county of Harris, State of Texas, have invented a new and useful Mold for Forming Walls and Floors; and I do hereby declare the following to be a full, clear, and exact description of the invention, such as will enable others skilled in the art to which it appertains to make and use the same.

The invention relates to wall and floor molds and has for its object to provide a mold of this character, whereby walls and floors may be formed in such a way that air and sound deadening passages are provided at spaced intervals in the wall or floor.

A further object is to provide a mold whereby walls and floors may be formed and to provide the mold with means adapted to coöperate with the reinforcing rods whereby the mold as a whole may be moved, so as to form the wall or floor by a step by step movement of the mold.

A further object is to provide the mold with brackets, said brackets having turn screws through which the reinforcing rods pass and nuts threaded on the turn screws and adapted to coöperate with the brackets, whereby the mold as a whole may be moved by a turning of the nuts or by hand. Also to provide the turn screws with set screws, whereby they may be prevented from movement in relation to the reinforcing rods.

With the above and other objects in view the invention resides in the combination and arrangement of parts as hereinafter described, shown in the drawings and claimed, it being understood that changes in the precise embodiment of the invention may be made, within the scope of what is claimed without departing from the spirit of the invention.

In the drawings:

Figure 1 is a side elevation of the mold, showing the same in position on the wall.

Fig. 2 is a sectional view taken on line 2—2 of Fig. 1.

Fig. 3 is a longitudinal sectional view through the mold and wall.

Fig. 4 is a sectional view through one of the jack screws.

Fig. 5 is a plan view of another form of mold used for forming floors showing a portion of flooring that has been formed.

Fig. 6 is a sectional view taken on line 6—6 of Fig. 5.

Fig. 7 is a sectional view taken on line 7—7 of Fig. 5.

Referring to the drawings the numeral 1 designated the base of a wall and 2 the wall, which is formed by the mold 3. The wall and base may be formed from any kind of plastic material, but it is preferably formed from cement. The mold 3 is designed to form wall, flooring and columns in such a manner that the forming operation will be a step by step one, and it is the object to form the wall and flooring with one or more chambers therein, so that the wall or flooring will be sound proof.

The mold 3 comprises the side plates 4, which are adapted to engage the sides of the wall. These plates 4 are held in spaced relation to each other by means of cross channel bars 5. Secured to the ends of the channel bars 5 as at 6 are downwardly and inwardly extending braces 7, which have their lower ends secured as at 8 to the lower edges of the side plates 4, thereby bracing the plates and at the same time maintaining them in their proper spaced relation to each other. Secured by means of rivets 9 to the upper surfaces of the channel bars 5 is a longitudinal bar 10. The bar 10 acts as stiffening means and also as means to which cores 11 may be secured as at 12. The cores 12 are preferably disposed centrally of the side plates 4 and are preferably hollow as shown at 13, thereby reducing the weight of the mold as a whole and at the same time allowing air to pass into the chamber formed in the wall, through the apertures 14, which apertures are in communication with the atmosphere.

Brackets 15 are secured as at 16 to the channels 5. Each of these brackets is provided with arms 17 having registering apertures 18, through which apertures jack screws 19 pass, there being nuts 20 threaded on the screws and disposed between the arms 17, said nuts being adapted to move the screws 19 longitudinally when the nuts are rotated. Each of the screws 19 is provided with longitudinal passages 21 through which one of the reinforcing rods 22 of the wall or flooring is adapted to pass, there being set screws 23 in the screws whereby the screws 19 may be prevented from longitudinal movement on the rods 22.

The operation is as follows. The base 1 of the wall is formed, then the mold is placed in position on the same and the reinforcing rods 22 passed through the screws 19. After this operation plastic material is placed in the mold between the side plates and around the cores. When the filling operation is brought to the proper height, the material is allowed to set. It now being necessary to move the mold upwardly as a whole, the set screws 23 are turned to securely clamp the same on the rods 22, then the nuts 20 are rotated by means of a wrench, this rotation of the nuts between the arms 17 will raise the mold as a whole. The above operation being continued until the wall is of the desired height. However as the cores are being withdrawn from the air chambers formed by the same in the wall, air will be admitted to the said chambers through the apertures 14, thereby eliminating any suction action, which may cause the inner surfaces of the air chambers to bulge inwardly.

Referring to Figs. 5 to 7 inclusive, it will be seen that the idea is the same as in the other form. However in this form the body 25 is angular in cross section, thereby forming a vertically disposed member 26, adapted to engage the end of the flooring that is being formed and a horizontal portion 27 which is adapted to engage the upper surface of a temporary wooden flooring. Cores 11 in this form extend angularly from the vertical portion 26 and are open at 14$^a$ for admitting air to the chambers during a moving action of the mold. Secured by means of rivets 28 to the body portion of the mold are brackets 29, said brackets being provided with arms 17$^a$ having apertures 18$^a$ through which screws 19$^a$ pass, there being a nut 20$^a$ threaded on said screws and disposed between the arms 17$^a$. A reinforcing rod 22$^a$, which is embedded in the flooring passes through the screws 19$^a$, there being set screws 23$^a$ whereby said screws 19$^a$ may be prevented from movement on the rods 22$^a$ when a turning action is imparted to the nuts 20$^a$. In this form the lower surface of the floor is formed by the temporary flooring 30, which is removed after the floor has dried out. The upper surfacing of the floor is done in the usual manner. The operation of moving the mold in this form is the same as in the other form, that is a step by step operation accomplished by means of the jack screws.

The invention having been set forth what is claimed as new and useful is:—

1. A mold for forming walls and floors comprising side plates for forming the sides of the wall or floor, means for maintaining the side plates of the mold in spaced relation to each other, dependent cores carried by the mold whereby chambers may be formed in the wall or floor, jack screws carried by the mold and telescopically engaging reinforcing rods of the wall or floor, means carried by said jack screws whereby they may be securely clamped to the reinforcing rods, said jack screws having nuts threaded thereon and engaging between arms of a bracket secured to the mold and coöperating with the arms of the bracket when rotated so as to raise the mold as a whole.

2. A mold for forming wall and floors comprising side plates for forming the sides of the wall or floor, means for maintaining the side plates of the mold in spaced relation to each other, dependent cores carried by the mold and being hollow, said cores having air passages in communication with the outside atmosphere, said cores being adapted to form chambers in the wall or floor, jack screws carried by the mold and telescopically engaging reinforcing rods in the wall or floor, means carried by said jack screws whereby they may be securely clamped to the reinforcing rods, said jack screws having nuts threaded thereon and engaging between arms of brackets secured to the mold and so coöperating with the arms of the brackets when rotated so as to raise the mold as a whole.

In testimony whereof I have signed my name to this specification in the presence of two subscribing witnesses.

WALTER SCOTT MURDOCK.

Witnesses:
   M. B. Matthews,
   Leslie A. Colwell.

Copies of this patent may be obtained for five cents each, by addressing the "Commissioner of Patents, Washington, D. C."